(12) United States Patent
Lowry

(10) Patent No.: US 6,304,703 B1
(45) Date of Patent: Oct. 16, 2001

(54) TILED FIBER OPTIC DISPLAY APPARATUS

(75) Inventor: Brian C. Lowry, Emlenton, PA (US)

(73) Assignee: Transvision, Inc., Pittsburgh, PA (US)

( * ) Notice: Subject to any disclaimer, the term of this patent is extended or adjusted under 35 U.S.C. 154(b) by 0 days.

(21) Appl. No.: 09/482,290

(22) Filed: Jan. 13, 2000

(51) Int. Cl.⁷ .............................. G02B 6/04; G09F 13/18; G09G 3/00
(52) U.S. Cl. .......................... 385/120; 385/115; 385/116; 385/121; 385/147; 385/901; 385/1; 385/42; 40/546; 40/547; 345/32; 345/40; 345/55; 359/451; 359/10; 359/11
(58) Field of Search ...................... 385/115, 116, 385/120, 121, 147, 901, 1, 2, 42; 40/546, 547; 345/32, 40, 55; 359/451, 10, 11

(56) References Cited

U.S. PATENT DOCUMENTS

| | | | |
|---|---|---|---|
| 3,295,910 | * | 1/1967 | Hourdiaux ........................ 359/451 X |
| 3,644,922 | * | 2/1972 | James et al. ..................... 385/121 X |
| 3,815,986 | * | 6/1974 | Darbee ............................. 385/901 X |
| 4,116,739 | * | 9/1978 | Glenn ..................................... 156/169 |
| 4,650,280 | * | 3/1987 | Sedlmayr ......................... 385/120 X |
| 5,376,980 | * | 12/1994 | Gersuk et al. ......................... 353/94 |
| 5,381,502 | * | 1/1995 | Veligdan ............................... 385/115 |
| 5,400,178 | * | 3/1995 | Yamada et al. ...................... 359/449 |
| 5,832,168 | * | 11/1998 | Yenter .................................. 385/147 |
| 6,219,184 | * | 4/2001 | Nagatani ............................. 359/472 |

* cited by examiner

Primary Examiner—Brian Healy
(74) Attorney, Agent, or Firm—Susan E. Nagel

(57) ABSTRACT

A fiber optic display apparatus consists of a plurality of optical fibers which convey a projected image from an input, or first surface, to a display, or second surface, whose area is greater than or equal to that of the first surface, such that any image projected on to the first surface appears enlarged on the second surface. The second surface is comprised of tiles which attach to adjoining tiles by means of flexible tabs and pliable locator rods in such a fashion as to allow the second surface to follow general contours (e.g. concave or convex), while the optical fiber bundles from each tile are collected into a fixture to form the first planar surface. Because of the modular design of the display it can be assembled or disassembled rapidly. A light-diff-using thin sheet or film is applied to the front of each tile of the second surface to effectively increase the numerical aperture of each fiber, thus producing a uniform wide-angle distribution of light from each fiber end and enabling viewing from any angle in front of the display.

17 Claims, 8 Drawing Sheets

FIG. 4A
Front/Back View
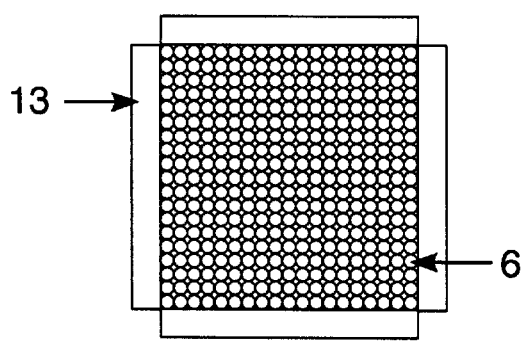
FIG. 4B
Side View
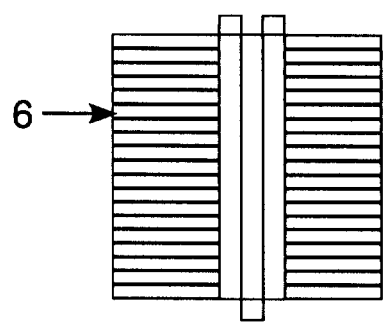
FIG. 4C
Top View
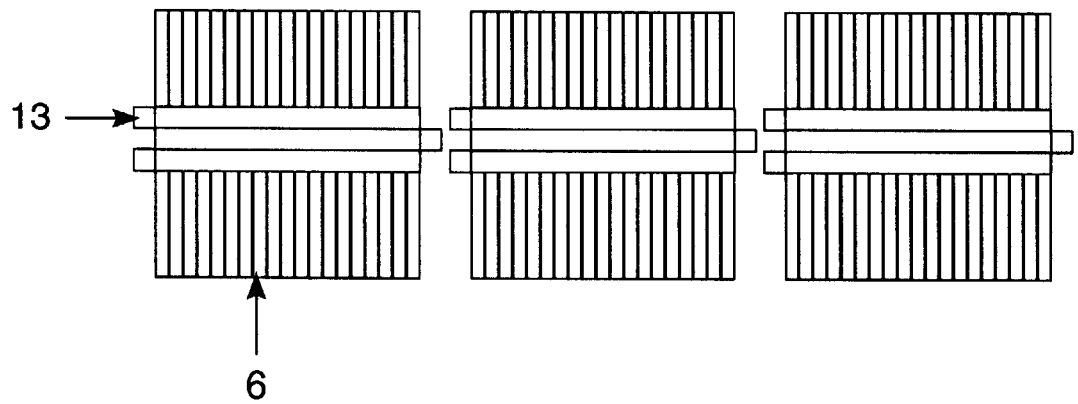
FIG. 4D
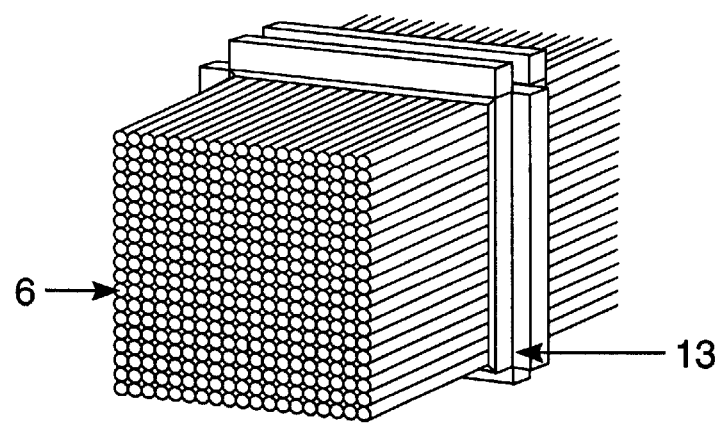
FIG. 4

TILED FIBER OPTIC DISPLAY APPARATUS

PATENTS REFERENCED

U.S. Pat. No. 5,832,168, U.S. Pat. No. 5,818,998, U.S. Pat. No. 5,381,502

BACKGROUND OF THE INVENTION

1. Field of the Invention

According to Stanford Resources, the Large Screen Display (LSD) market will generate revenues of nearly $4 billion annually by 2002[1]. LSD's are typically used in sports stadia and arenas, airports, casinos, and areas of high pedestrian and vehicular traffic. High initial cost, high maintenance costs, installation requirements, and lack of robustness have prevented current LSD technologies from more quickly penetrating the marketplace. Moreover, current LSD technology is limited to two dimensions (i.e. planar displays), and thus is not as appealing for new LSD uses such as interactive gaming and immersive environments such as simulators, and integration with architectural structures. [1]"Large Screen Information Displays—Market Trends, Technologies—Applications," Third Edition 1995–96, Stanford Resources, Inc.

Fiber optic LSD's offer substantial improvements over current CRT- and LED-based displays, due to their smaller depth, lighter weight, and elimination of sensitive and expensive electronic components on the surface of the display. Because the displayed image is generated by a data/video projector, LCD panel, or other equivalent spatial light modulator, fiber optic displays are not "resolution bound" as are LED and CRT displays, which are comprised of a fixed number of RGB pixels on the display surface. Furthermore, fiber optic LSD's generate neither heat nor EMI at the display surface.

Fiber optic displays, however, are not without shortcomings. One of the most difficult technical problems of LSD's is the tiling or "shingling" effect due to slight misalignment of the many tiles of which the display is comprised. This problem is made worse in fiber optic displays, where it is imperative that the fibers terminate on the display at precisely right angles. Without such precise termination, the displays appear to lack uniformity in brightness. Since the human visual system is very adept at pattern recognition, means must be taken to mitigate the effects of the inter-tile mullions as well as the alignment and termination of the fiber terminals.

2. Description of Related Art

Several LSD's have been successfully constructed using optical fiber, and modular displays have been patented. However, because of the method by which the modules are joined, as well as the lack of a suitable light-shaping diffusion element at the display surface, current displays cannot be contoured.

The use of smaller tiles is based upon the concept of a "throw-away" display. In other words, if one or more of the tiles are damaged (e.g., by the impact of a rock or other hard object), they can be discarded and replaced in the field at minimal cost, without dismantling the entire display.

U.S. Pat. No. 5,832,168 discloses a fiber optic display comprised of modules which can be adjusted both horizontally and vertically to eliminate the shingling effect. Because of the two-dimensional alignment mechanism, contoured display surfaces are not feasible with this invention. No lensing process is discussed in this patent, a feature that is essential for contoured displays.

U.S. Pat. No. 5,818,998 discloses a portable fiber optic LSD. The specific embodiment disclosed is not modular, however, and may only be contoured by wrapping it around a contoured object.

U.S. Pat. No. 5,381,502 discloses a thin or curved display comprised of fixed waveguides. Because of its reliance on a scanning device, such as a laser, for producing the image, the physical dimensions and contours of the display are limited. As with the preceding patent, the display is not modular.

BRIEF SUMMARY OF THE INVENTION

A novel solution to many of these limitations is the intent of the present invention. A contourable fiber optic display apparatus comprised of modular tiles is disclosed. Despite the possible contours introduced by the tiles, the display can be viewed from any angle because the luminance from each tile is essentially constant. The application of the light diffusing film obscures each distal fiber end to the point that the human eye cannot detect small tile misalignments or mullions. Moreover, the small, lightweight tiles are comprised entirely of rugged materials and plastic optic fiber, making the display ideal for "harsh" environments. A method of construction is described which allows the display tiles to be semi-permanently joined by flexible members such that the entire LSD can be quickly set up and taken down and can be easily stored in a small place for transport. Such a display is ideal for military field use, for outdoor sporting events, and for trade shows. Permanent displays can be fabricated as well.

DETAILED DESCRIPTION OF THE INVENTION

Figure 1:
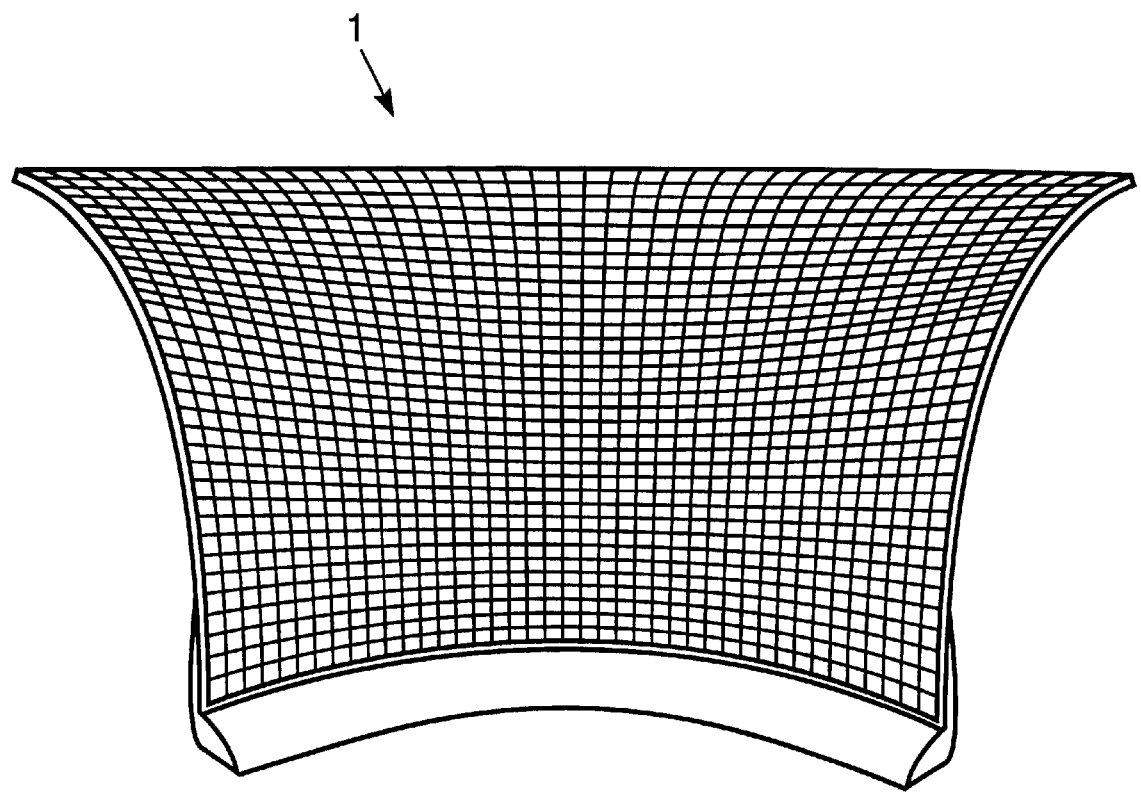
FIG. 1 depicts an example of a contoured large screen display.
Figure 2:
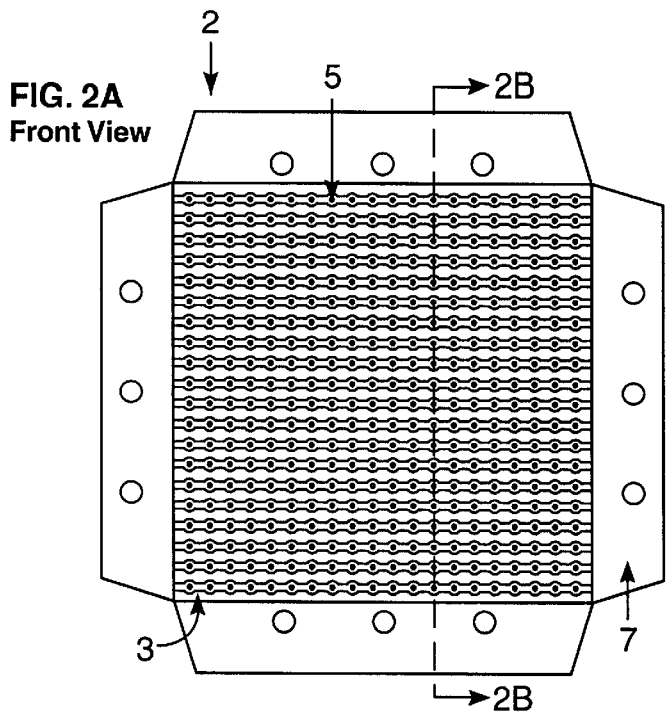
FIG. 2 shows three views—front (FIG. 2A); side (cut-away) (FIG. 2B); and rear perspective view (FIG. 2C) of a specific embodiment of the present invention.
Figure 2:
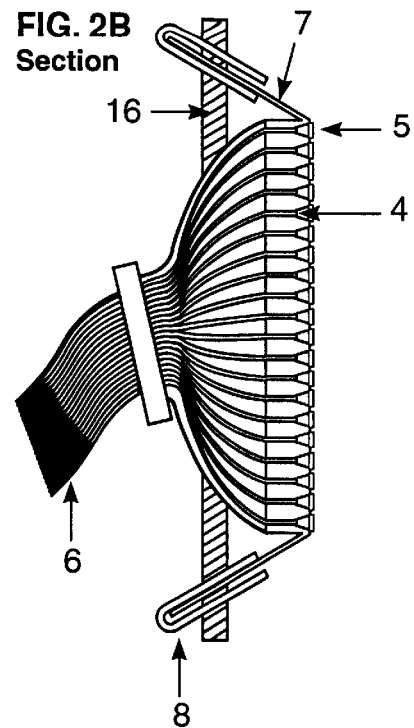
Figure 2:
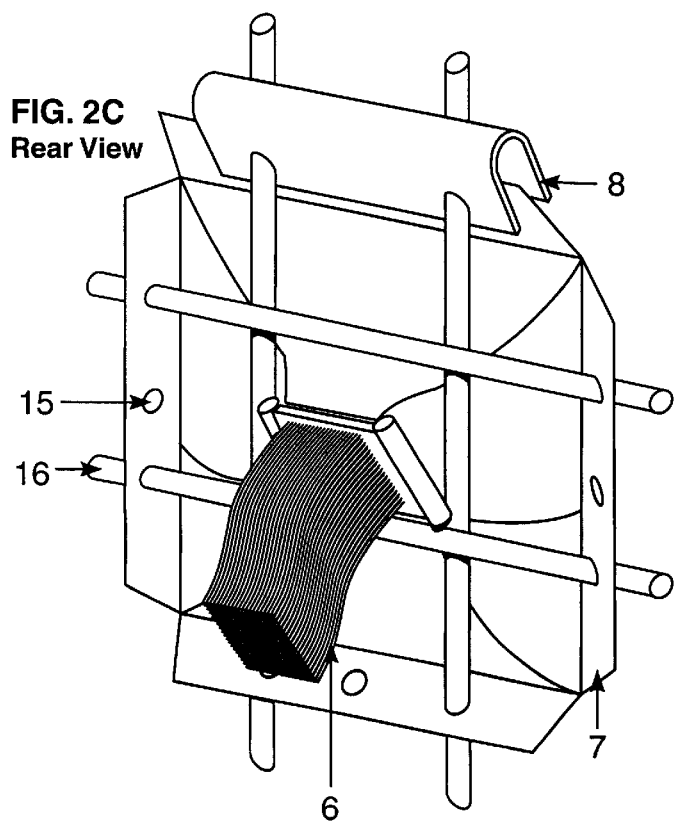

The present invention is an LSD comprised of a matrix or array of tiles. An exemplary multiply contoured optical display (1) is illustrated in FIG. 1. Each display consists of a plurality of equally sized tiles (2) adjoined to each other and/or a structural frame (14), in rows and columns, and supported by flexible support rods (16), as may be viewed in FIG. 3. FIGS. 2A–C are referred to in the following description of the display tiles. Each display tile (2) is assembled from parts made of injection-molded plastic, ABS, polycarbonate, or other material appropriate to the environmental conditions in which the display will be deployed. The size of each tile (2) is sufficiently small as to allow the radius of curvature required to contour the display in the desired fashion, with smaller tiles (2) allowing a smaller radius (greater curvature). In the specific embodiment disclosed, the tile size is a 152 mm (6 in.) square, and is comprised of three distinct parts: a front piece, a lower cowl, and an upper cowl, which are snapped and cemented together after the fibers are inserted into front the piece, as is standard in the art. The lower and upper cowls, in addition to protecting the fibers, serve as a strain relief for the fiber bundle (6). The display surface (3) of each tile is perforated by a matrix of concave orifices (4) into which the distal fiber optic ends (5) terminate as may be viewed in FIGS. 2A and 2B. The half-angle of the concave orifices (4) must correspond to the numerical aperture (NA) of the fiber used, such that the cone of light emitted from the distal fiber (5) end is not occluded or limited. The fiber optic strands are collected into a pigtail (6) and are run out of the rear of the enclosed tile (2) as shown in FIGS. 2B and 2C. The tile assembly (2) is then filled with expanding foam that serves to both insulate and protect the fiber optic strands enveloped therein. On the surface of the display (3), the fiber terminals (5) are located so that they are slightly recessed with respect to the tile surface as is illustrated in FIG. 2B, and are affixed with optical epoxy (e.g., EpoTek 301). A light-shaping diffusion film, preferably a holographic diffusion film with very high optical transmission and low back-scattering, is then applied to the display surface (3) of each tile (2). The diffusion film is stamped out in such a manner as to leave approximately 30% of the tile surface exposed, as illustrated in FIG. 2A. Exposing greater or lesser percentages of the tile with the holographic diffusion film relates to the application of the display. For example, indoor displays requiring higher pixel densities may have up to 100% of the tile surface covered by the holographic film. The base material chosen for the tile (2) must be black, with a matte or stippled surface in order to enhance the contrast of the display by absorbing ambient light. Alternatively, a translucent or light-diffusing material may be used for the base material. In this case, black, light-absorbing material may be adhered, or silk-screened onto the tile surface to achieve the same effect as illustrated in FIG. 2A. The pitch or spacing between adjacent distal fiber ends (5) is determined by the application, so that displays to be used for proximal viewing will have a higher pixel density than displays used for viewing at a distance. In the specific embodiment disclosed, the display surface (3) is designed with a matrix of orifices spaced 4 mm on center, so that pixel pitches in multiples of 4 mm may be used (e.g., 4 mm, 8 mm, 16 mm, etc). The present invention uses a uniform 8 mm on center pitch in both the vertical and horizontal axes. The distal fiber ends (5) on the perimeter of the tile are situated half of the pixel pitch, or 4 mm, from the tile edge, so that when several tiles are joined, the 8 mm pitch is preserved. Each tile (2) is designed with tabs (7) along each of its four sides (edge tiles may have only three tabs and corner tiles only two tabs) as shown in FIG. 2. The tabs, (7) although part of each tile (2), are flexible. Each tile (2) is joined to its four (or three) neighboring tiles by means of a clip (8) which are inserted around and slid over adjacent tabs. Alternatively, several different clip widths can be made which "force" the adjoining tiles to be disposed at specific angles.

Figure 6:
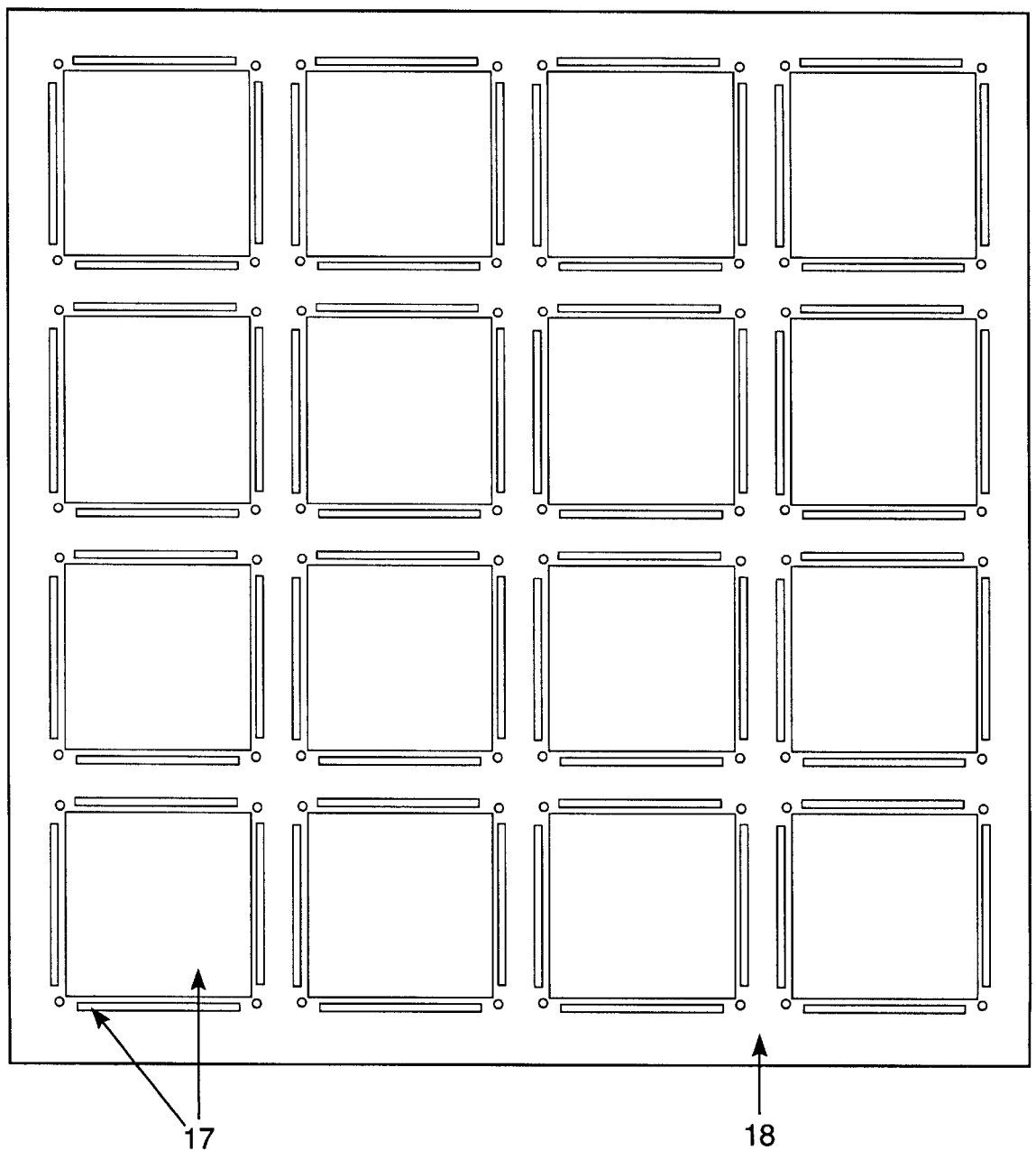
FIG. 6 shows how a piece of material can be cut out to form an interstitial webbing that can be used to hold display tiles in proximity in a secondary embodiment of the present invention.
Figure 7A:
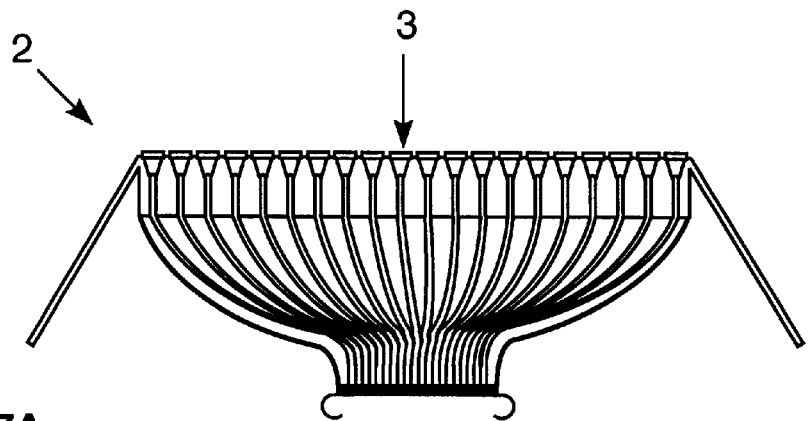
FIG. 7 shows two views; a top (FIG. 7A); and front perspective (FIG. 7B) of a simple mechanism for quickly connecting optical fiber bundles to display tiles.
Figure 7B:
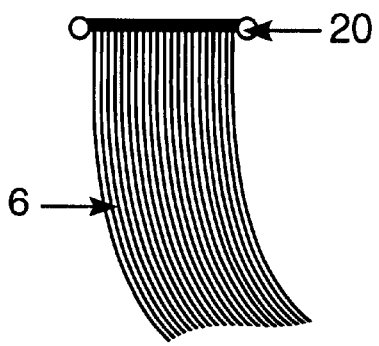
Figure 7:
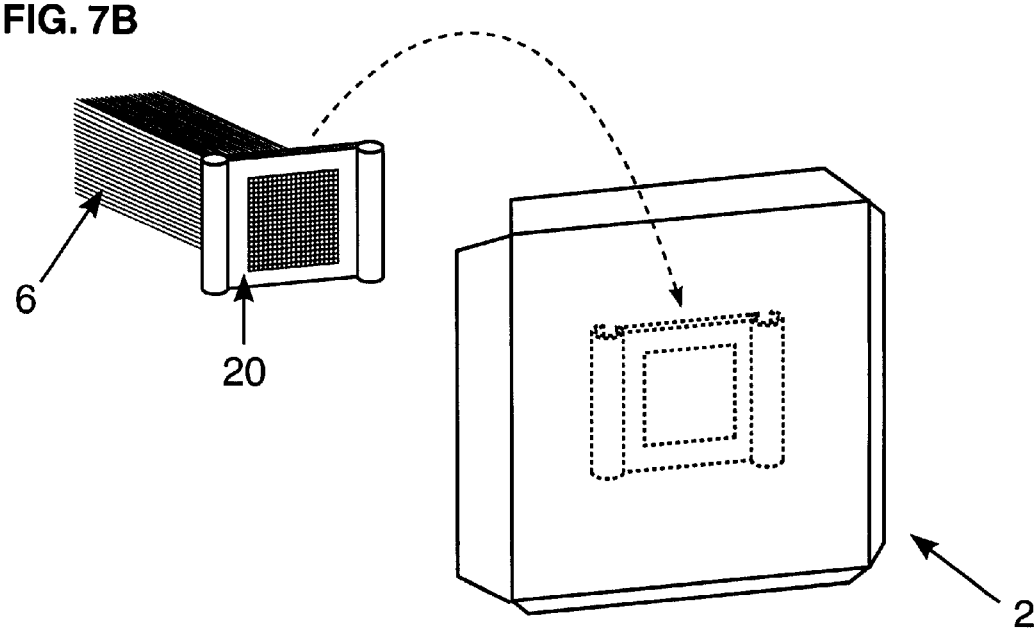

Optionally, in a secondary embodiment of the invention, an interstitial fabric webbing (18) can be used to semi-permanently locate each tile in proximity to its neighbors as is illustrated in FIG. 6. In FIG. 6, the white areas (17) correspond to the portion of the material that is cut out, while the shaded areas (18) correspond to the material itself. During assembly of the tiles, the front piece of each tile is placed in front of the material (18), the tabs (17) and locator pins inserted through the material, and then the two rear cowl pieces are snapped and cemented onto the front piece as is standard in the art. Such a webbing (18) facilitates a more rapid set-up and tear-down of the display if it is to be used for a temporary application. To further aid in rapid set-up and take-down of the display, an optical coupler (20) may be used where the fiber bundle emerges from the rear of the tile as illustrated in FIGS. 7A and 7B. The optical coupler (20) is attached to each fiber bundle (6) by means of a collar which has a mating attachment fixed to the rear of the display tile assembly (2), as may be viewed in FIGS. 3 and 4E. By separating the fiber bundle from the display tile, a matrix of display tiles, joined by interstitial webbing (18), may be folded in the same fashion as a map. Efficient optical coupling between fiber bundles is achieved by the use of spherical, refractive, or diffractive microlens arrays such as are known by those skilled in the state of the art. The fiber bundles may be color coded according to length, and each bundle may be marked so as to make clear its orientation.

Figure 3:
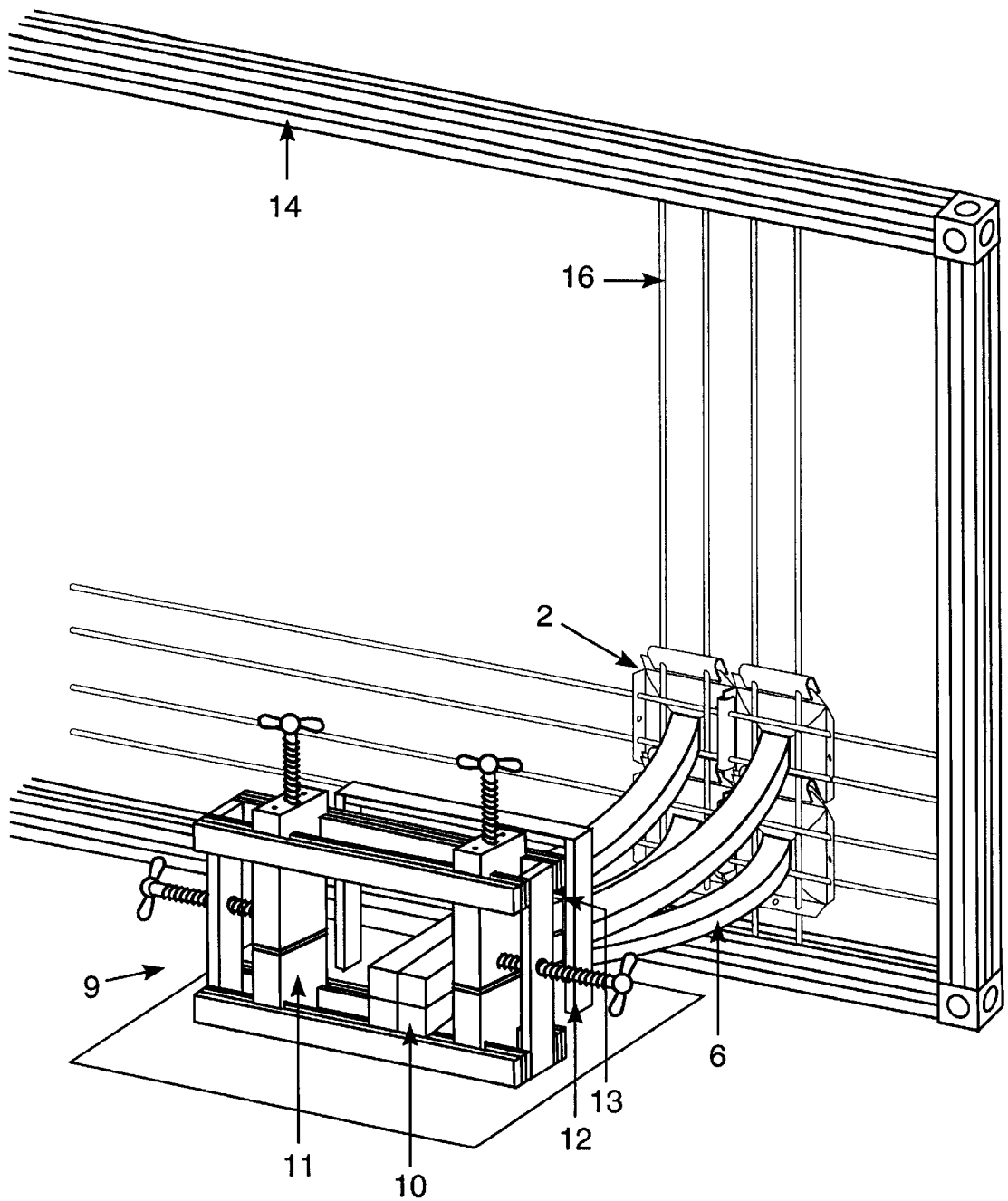
FIG. 3 shows a rear perspective view of a modular display, showing the relationship between display tiles and their corresponding inputs.
Figures 4, 4E:
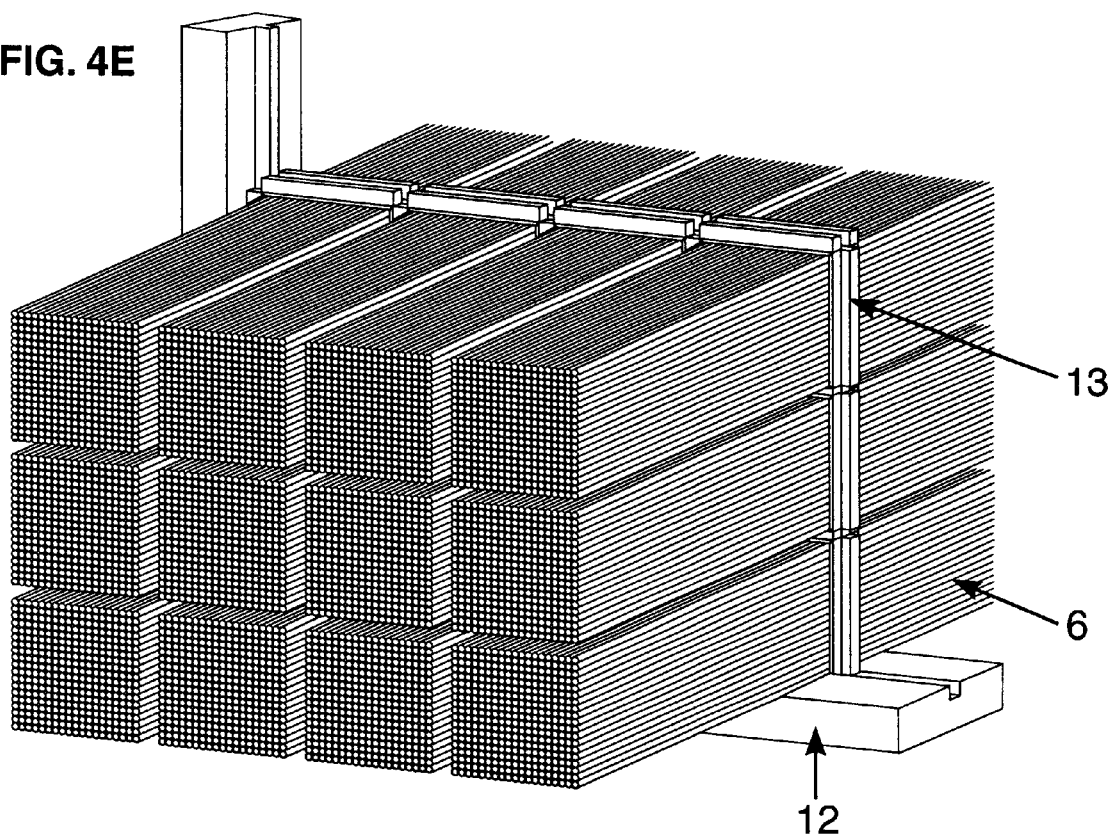
FIG. 4 shows five views; a front/back (FIG. 4A); side (FIG. 4B); top (FIG. 4C); and perspective (FIG. 4D) of the design of the fiber bundle collars used in the secondary input matrix.
FIG. 4E shows how the fiber bundle collars are attached to each other and to the secondary input matrix.
Figure 5:
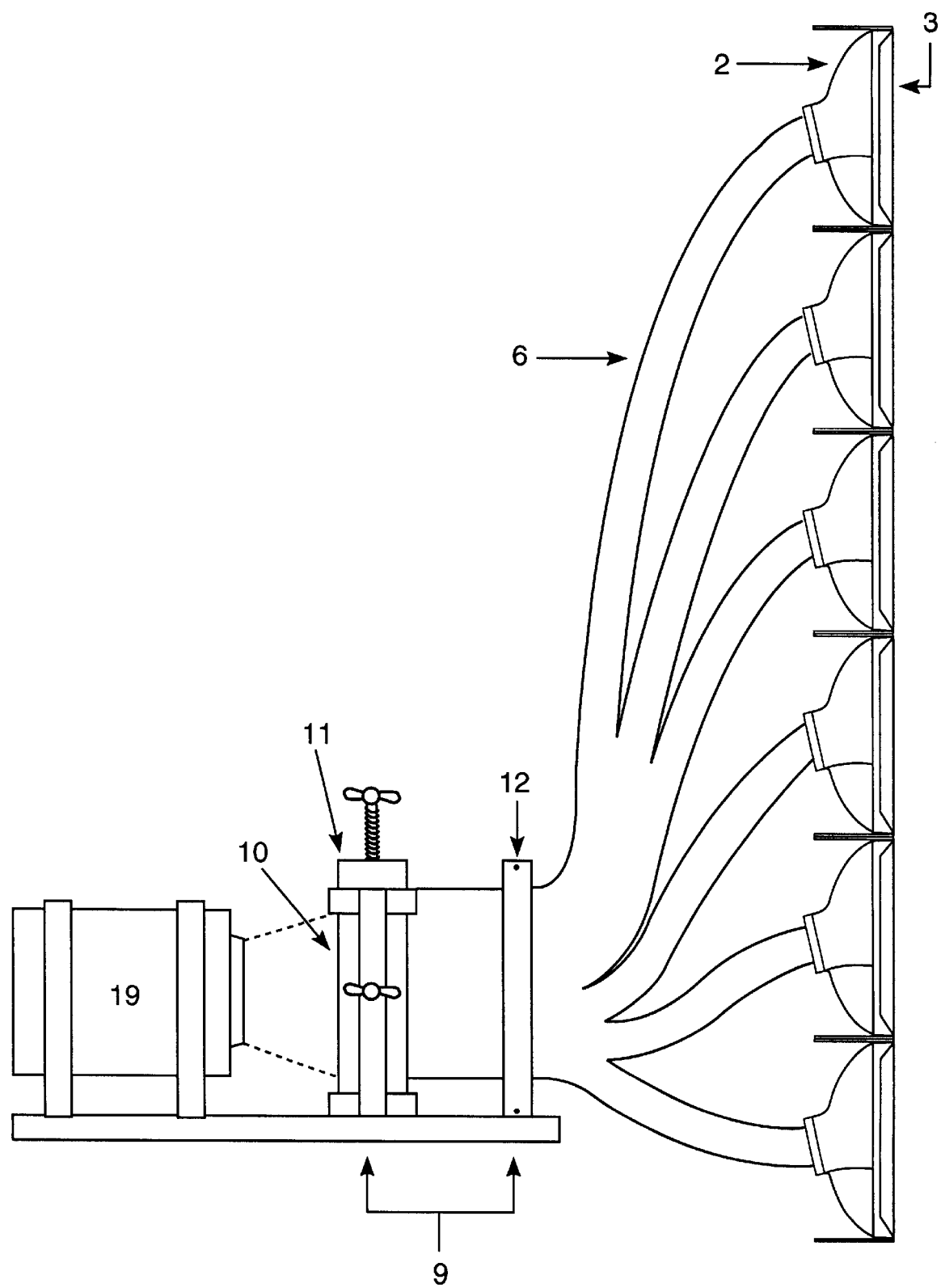
FIG. 5 shows a block diagram of a complete LSD system, including projector, primary and secondary input matrices, and display surface.

The fiber pigtail (6) emerging from the rear of each tile (2) is jacketed so as to protect the fibers from damage. The fiber pigtails are then collected into a dual input matrix assembly (9) which collectively forms the projection surface (10) as shown in FIGS. 3 and 5. The primary input matrix assembly (11) is designed in such a way as to allow for two degrees of freedom, such that a wide range of display sizes and formats (e.g., 3:4 or letterbox) can be accommodated. A secondary input matrix (12) interposed between the display tiles and the primary input matrix (11), limits the motion of the fiber pigtails (6) in the direction longitudinal to the path of light through the system. This is achieved by affixing a collar (13) at a fixed distance from the polished end of each fiber pigtail as show in FIGS. 4A–E. The collars (13) consist of male and female tabs that lock together so that all of the collars (13) are coplanar. This aspect of the dual input matrix assembly (9) is essential in that if the fiber pigtail input ends are not coplanar, any image projected onto the projection surface (10) will have segments that are out of focus. The input matrix assembly (9) may be disposed at any angle or position relative to the display (1) as constrained by the location of the display installation.

A structural frame (14) may be used in non-permanent applications as may be viewed in FIG. 3. Such a frame (14) may be constructed of extruded or tubular aluminum, plastic, or other suitable material. Each display tile (2) has a series of vertical and horizontal locator passages (15) through which flexible locator rods (16) pass. Alternatively, the locator passages can be formed into the clips (7) that are used to attach adjoining tiles as shown in FIGS. 2B, 2C, and 3. The locator rods (16) can then be attached to the top, bottom, and two sides of the structural frame as illustrated in FIG. 3. The projection device (19) and other electronics are disposed in a separate enclosure from the display. After the display is assembled, the projector assembly is mounted to the input matrix assembly (9), as may be viewed in FIG. 5.

SUMMARY AND CLAIMS

The fiber optic display screen of the present invention provides a novel method for forming modular contoured or planar displays from small, inexpensive tiles, while still maintaining uniform viewing from any position or angle. Moreover, the display is rugged and portable. Although specific embodiments are disclosed herein, such embodiments are not intended to limit the scope of the following claims.

What is claimed is:

1. A multiply-contoured optical display (1) consisting of a plurality of tiles (2), a dual input matrix assembly (9), a display surface (3) and a connecting means between assembly (9) and surface (3) for the purpose of conveying and, in general, enlarging images;
   a structural frame (14) and matrix of flexible horizontal and vertical locator rods (16) which attach to the tiles (2) to provide stability to the display (1);
   a means of projecting spatially modulated light images onto the input assembly (9) of said display (1);
   a means of connection between tiles (2) which allows a multiply-contoured display of virtually any size and/or shape.

2. The display (1) of claim 1 in which the display surface (3) is partially or fully covered by a holographic diffusion film to act as a light-shaping diffuser for the purpose of increasing the effective numerical aperture of the fibers and thus creating a uniform distribution of light irrespective of viewer position (viewing angle).

3. The display (1) of claim 1 in which the connecting means between input assembly (9) and the display surface (3) is comprised of fiber optics (5) or other type of optical light guide, which terminate on display surface (3) and are collected into a pigtail (6).

4. The display (1) of claim 3 in which a mechanism is provided for quickly connecting and disconnecting the fiber pigtails (6) from the rear of the display tiles (2) for the purpose of rapid setup and take-down of the display (1) which involves an optical coupler (20) attached to both tile (2) and pigtail (6).

5. The display (1) of claim 3 in which the distal fiber optic ends (5) are recessed in orifices (4) in the display surface (3) such that the point of light emitted from each distal fiber end (5) is enlarged by the holographic diffusion film on the display surface (3).

6. The display (1) of claim 1 in which the means of projection consist of any type of spatial light modulator (19), whether transmissive or reflective, for the purposes of conveying moving or static images to the input assembly (9).

7. The display (1) of claim 1 in which the dual input assembly (9) consists of two distinct components, a primary (11) for forming a projection surface (10) by organizing the pigtails (6) in a matrix in horizontal and vertical directions, and a secondary (12) for fixing the pigtails (6) in such a fashion so as to limit their movement in a direction perpendicular to the plane formed by the projection surface (10) by fixing a collar (13) to said fiber pigtail (6).

8. The display (1) of claim 1 in which the dual input assembly (9) receives a plurality of pigtails (6) from said display tiles (2), distributed in a regular array corresponding one-to-one to the arrangement of the display surface tiles (2), such that the pigtails (6) and their associated display tiles (2) can be readily removed and replaced.

9. The display (1) of claim 1 in which the structural frame (14) consists of tubular or extruded metal or plastic elements to which are attached pliable horizontal and vertical locator rods (16) which give structural stability to the surface created by joining the display tiles (2).

10. The display (1) of claim 1 in which the display tiles (2) are square, rectangular, or, in general, polygonal in shape with flexible tabs (7) on each of four or three sides.

11. The display (1) of claim 1 in which the means of connection between tiles (2) are flexible tabs (7) on the side of tile (2) attached to clips (8) which allows for a multiply-contoured or planar display (1) of virtually any size and/or shape.

12. The display (1) of claim 1 in which the display tile (2) is molded or machined in such a fashion as to allow for a range of pixel densities so that the same tile assembly may be used for a wide variety of display applications.

13. The display (1) of claim 1 in which the means of connection between multiple display tiles (2) can be an interstitial webbing (18) of plastic, canvas, or other fabric or material, which aids in the rapid set-up, take-down and ease of storage and transportation of said display (1).

14. A multiply-contoured optical display (1) consisting of a plurality of tiles (2) attached to each other by tabs (7) with a display surface (3) containing a holographic diffusion film; a dual input assembly (9) connected to said tiles (2) by fiber optics (5) grouped into pigtails (6) for purpose of conveying and enlarging images and recessed in orifice (4) in display surface (3) such that a point of light from optics (5) is enlarged by diffusion film on display surface (3); said dual input assembly (9) containing a primary assembly (11) for forming a projection surface (10) by organizing the fiber pigtail (6) in a matrix in horizontal and vertical directions, and a secondary assembly (12) for fixing the fiber pigtail (6) to limit movement in direction perpendicular to plane formed by said projection surface (10) by fixing a collar (13) to said fiber pigtail (6); a structural frame (14) with locator rods (16) attaching to tiles (2) to provide stability to display (1); a spatial light modulator (19) for conveying moving or static images to dual input assembly (9).

15. A display (1) of claim 14 in which said fiber optics (5) connected to said tiles (2) may be quickly connected or disconnected by way of an optical coupler (20).

16. A multiply-contoured optical display (1) consisting of a plurality of tiles (2) attached to each other by an interstitial webbing with a display surface (3) containing a holographic diffusion film; a dual input assembly (9) connected to said tiles (2) by fiber optics (5) grouped into pigtails (6) for purpose of conveying and enlarging images and recessed in orifice (4) in display surface (3) such that a point of light from optics (5) is enlarged by diffusion film on display surface (3); said dual input assembly (9) containing a primary assembly (11) for forming a projection surface (10) by organizing the fiber pigtail (6) in a matrix in horizontal and vertical directions, and a secondary assembly (12) for fixing the fiber pigtail (6) to limit movement in direction perpendicular to plane frowned by said projection surface (10) by fixing a collar (13) to said fiber pigtail (6); a structural frame (14) with locator rods (16) attaching to tiles (2) to provide stability to display (1); a spatial light modulator (19) for conveying moving or static images to dual input assembly (9).

17. A display (1) of claim 16 in which said fiber optics (5) connected to said tiles (2) may be quickly connected or disconnected by way of an optical coupler (20).

* * * * *